US008614978B2

(12) United States Patent
Che et al.

(10) Patent No.: US 8,614,978 B2
(45) Date of Patent: Dec. 24, 2013

(54) APPARATUS, METHOD AND ARTICLE OF MANUFACTURE

(75) Inventors: Xiang Guang Che, Beijing (CN); Peng Chen, Beijing (CN); Frank Frederiksen, Klarup (DK); Troels Emil Kolding, Klarup (DK); Esa Tapani Tiirola, Kempele (FI)

(73) Assignee: Nokia Siemens Networks Oy, Espoo (FI)

( * ) Notice: Subject to any disclaimer, the term of this patent is extended or adjusted under 35 U.S.C. 154(b) by 14 days.

(21) Appl. No.: 13/147,489

(22) PCT Filed: Feb. 3, 2009

(86) PCT No.: PCT/EP2009/051187
§ 371 (c)(1),
(2), (4) Date: Jan. 13, 2012

(87) PCT Pub. No.: WO2010/088950
PCT Pub. Date: Aug. 12, 2010

(65) Prior Publication Data
US 2012/0106569 A1    May 3, 2012

(51) Int. Cl.
*H04W 4/00* (2009.01)
(52) U.S. Cl.
USPC ....................................................... 370/328
(58) Field of Classification Search
None
See application file for complete search history.

(56) References Cited

U.S. PATENT DOCUMENTS

| 8,335,165 | B2* | 12/2012 | Shen et al. | 370/252 |
|---|---|---|---|---|
| 2009/0207793 | A1* | 8/2009 | Shen et al. | 370/329 |
| 2010/0210256 | A1* | 8/2010 | Shen et al. | 455/422.1 |
| 2011/0141878 | A1* | 6/2011 | Che et al. | 370/216 |
| 2011/0173519 | A1* | 7/2011 | Kuri et al. | 714/799 |
| 2011/0310856 | A1* | 12/2011 | Hariharan et al. | 370/336 |

FOREIGN PATENT DOCUMENTS

| EP | 1 798 926 A1 | 6/2007 |
|---|---|---|
| WO | WO 2008/041824 A2 | 4/2008 |

OTHER PUBLICATIONS

H. Atarashi e M. Nakagawa, "An efficient ARQ scheme for multi-carrier modulation systems based on packet combining", IEICE TR CO, E82B(5), 1999, pp. 731-739.

3GPP TS 36.213 V8.4.0 (Sep. 2008), 3rd Generation Partnership Project; Technical Specification Group Radio Access Network; Evolved Universal Terrestrial Radio Access (E-UTRA); Physical layer procedures (Release 8) (60 pages).

Ericsson: "Details of ACK/NAK bundling for TDD"; R1-081528; 3GPP TSG-RAN WG1 #52bis, Shenzhen, China, Mar. 31-Apr. 4, 2008; pp. 1-4 [online] Internet: URL:http://www.3gpp.org/ftp/tsg_ran/WG1_RL1/TSGR1_52b/Docs/R1-081528.zip.

Catt et al: "UL Control Channel Scheme for LTE-A"; R1-090188; 3GPP TSG RAN WG1 meeting #55bis, Ljubljana, Slovenia, Jan. 12-16, 2009; pp. 1-5 [online] Internet: URL:http://www.3gpp.org/ftp/tsg_ran/WG1_RL1/TSGR1_55b/Docs/R1-090188.zip.

(Continued)

*Primary Examiner* — Raj Jain
(74) *Attorney, Agent, or Firm* — Harrington & Smith (57) ABSTRACT

There is provided a method including performing frequency domain acknowledgement/negative acknowledgement (ACK/NAK) bundling across component carriers within a user equipment reception bandwidth; generating a bundled ACK/NAK value corresponding to at least one code word on the basis of the performed ACK/NAK bundling; and including information relating to the generated bundled ACK/NAK value and the number of detected downlink grants within the user equipment reception bandwidth in an ACK/NAK resource to be transmitted on an uplink control channel.

19 Claims, 5 Drawing Sheets

(56) References Cited

OTHER PUBLICATIONS

Texas Instruments et al: "Way forward on TDD PUCCH multi-bit ACK/NAK transmission"; R1-083291; 3GPP TSG RAN WG1 #54, Jeju, South Korea, Aug. 18-22, 2008; pp. 1-6 [online] Internet: URL:http://www.3gpp.org/ftp/tsg_ran/WG1_RL1_/TSGR1_54/Docs/R1-083291.zip.

LG Electronics: "Bundled ACK/NACK in TDD"; R1-081815; 3GPP TSG RAN WG1#53, Kansas City, USA, May 5-9, 2008; pp. 1-5; [online] Internet: URL:http://www.3gpp.org/ftp/tsg_ran/WG1_RL1/TSGRI_53/Docs/R1-081815.zip.

ZTE: "Uplink Control Channel Design for LTE-Advanced"; R1-090078; 3GPP TSG RAN WG1 Meeting #55bis, Ljubljana, Slovenia, Jan. 12-16, 2009, pp. 1-4; [online] Internet: URL:http://www.3gpp.org/ftp/tsg_ran/WG1_RL1/TSGR1_55b/Docs/R1-090078.zip.

* cited by examiner

APPARATUS, METHOD AND ARTICLE OF MANUFACTURE

FIELD OF THE INVENTION

The present invention relates to control channel design of a mobile communication network. More particularly, the invention relates to a method, an apparatus, and an article of manufacture comprising a computer readable medium.

BACKGROUND ART

In the ongoing evolution of advanced radio systems, carrier aggregation has been considered as one possibility to meet the backwards compatibility requirements for example in one realization of a Long Term Evolution Advanced (LTE-A). LTE-A is the next step from LTE, fulfilling the requirements of the fourth generation (4G) communication network as specified by the International Telecommunications Union (ITU). LTE is also the next step from a universal mobile telecommunications system (UMTS).

Some of the main requirements related to the backwards compatibility are for example: a Release 8 E-UTRA (enhanced UMTS terrestrial radio access) terminal must be able to work in an Advanced E-UTRAN (enhanced UMTS terrestrial radio access network), and an advanced E-UTRA terminal must be able to work in a Release 8 E-UTRAN.

LTE-A applies a physical uplink control channel (PUCCH) to transmit control signals, such as an acknowledgement (ACK)/negative-ACK (NAK), a channel quality indicator (CQI) and a scheduling request (SR) indicator, from user equipment (UE) to an evolved node B (eNB). There are two alternative ways to transmit uplink control signals in LTE-A: (1) PUCCH and (2) PUSCH (physical uplink shared channel) time-multiplexed with uplink data. This application deals mainly with uplink control signals on the PUCCH. From the point of view of uplink/downlink control signalling, one solution is to copy the existing Release 8 control plane (PDCCH, PUCCH etc.) to each component carrier (CC). From now on, this concept is denoted as a NxPDCCH structure in LTE-Advanced. Due to the backwards compatibility requirement, it is also assumed that Release 8 type PUCCH resources are reserved for each downlink component carrier transmitting PDCCH. Those resources are located on the corresponding uplink component carriers.

One baseline assumption for LTE-Advanced has been to support one transport block and HARQ (hybrid automatic repeat request) entity per component carrier. It is generally understood that having one separate PDCCH per component carrier (NxPDCCH) seems to be a suitable downlink control signalling approach for such system operation. From the point of view of the uplink control signalling, there are certain aspects that require special attention when using the NxPDCCH approach. One aspect is cubic metric (CM) properties. Multi-carrier transmission is always realized in uplink when uplink/downlink resources are allocated into different component carriers. From uplink point of view, single carrier transmission should be the target whenever possible to minimize the CM, i.e. the simultaneous transmission of parallel PUCCHs (NxPUCCH) should be avoided. Another aspect is control channel coverage in uplink. Multi-ACK/NAK transmission (ACK/NAK multiplexing) is always realized when more than one downlink component carrier is allocated. Uplink coverage is an issue with multi-bits ACK/NAK. Therefore, ACK/NAK bundling, i.e. one common ACK/NAK for all downlink transport blocks and allocated component carriers, should always be an option to ensure optimized uplink coverage. Thus, more advanced control channel design solutions are needed to support ACK/NAK bundling on the PUCCH.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented below.

Various aspects of the invention comprise a method, an apparatus, and an article of manufacture comprising a computer readable medium as defined in the independent claims. Further embodiments of the invention are disclosed in the dependent claims.

According to an aspect of the invention, there are provided apparatuses as specified in claims 1 and 19.

According to an aspect of the invention, there are provided methods as specified in claim 10.

According to an aspect of the invention, there is provided an article of manufacture comprising a computer readable medium as specified in claim 16.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments and with reference to the attached drawings, in which.

DETAILED DESCRIPTION OF SOME EMBODIMENTS

Exemplary embodiments of the present invention will now be described in more detail with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, server, corresponding component, and/or to any communication system or any combination of different communication systems. The communication system may be a fixed communication system or a mobile communication system or a communication system utilizing both fixed networks and mobile networks. The used protocols, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE/SAE (Long Term Evolution/System Architecture Evolution) network elements without however restricting the embodiment to such an architecture. Further, the following embodiments describe examples specifying HARQ for code-word/transport block. However, any other HARQ entity/granularity can be used instead, i.e. HARQ-ACK may be associated with code-word (physical layer entity) or transport block (MAC layer entity).

Figure 1:
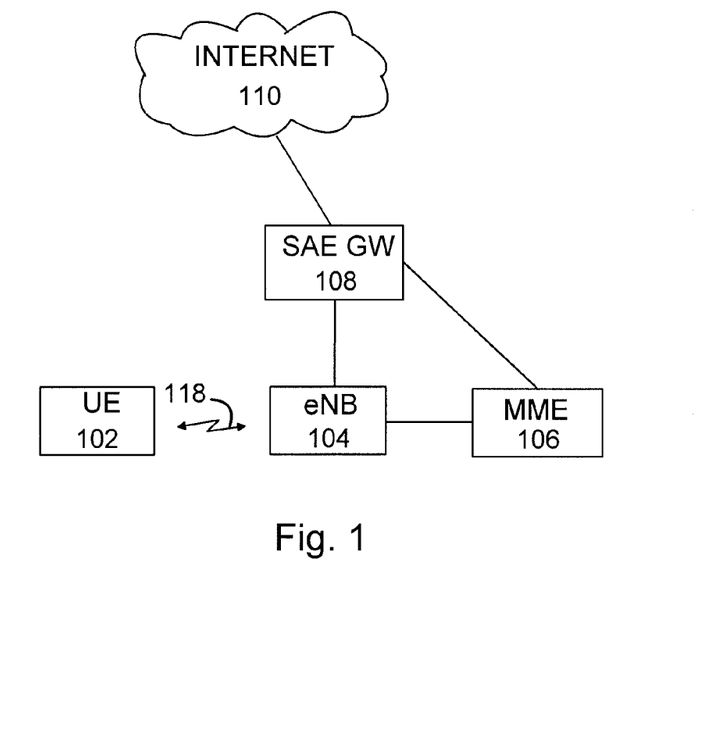
FIG. 1 shows a simplified block diagram illustrating an exemplary system architecture.

With reference to FIG. 1, let us examine an example of a radio system to which embodiments of the invention can be applied. In this example, the radio system is based on LTE/SAE (Long Term Evolution/System Architecture Evolution) network elements. However, the invention described in these examples is not limited to the LTE/SAE radio systems but can also be implemented in other radio systems, such as WIMAX (Worldwide Interoperability for Microwave Access), or in other suitable radio systems.

A general architecture of a radio system is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication are irrelevant to the actual invention. Therefore, they need not be discussed in more detail here.

The exemplary radio system of FIG. 1 comprises a service core of an operator including the following elements: an MME (Mobility Management Entity) 106 and an SAE GW (SAE Gateway) 108.

Base stations that may also be called eNBs (Enhanced node Bs) 104 of the radio system host the functions for Radio Resource Management: Radio Bearer Control, Radio Admission Control, Connection Mobility Control, Dynamic Resource Allocation (scheduling). The MME 106 is responsible for distributing paging messages to the eNBs 104.

User equipment (UE) 102 which may also be called mobile terminals may communicate with the base station 104 using signals 118. Signals 118 between the UE 102 and the base station 104 carry digitized information, which is e.g. traffic data or control data.

The calls/services may be "long distance" where user traffic passes via the SAE GW 108. For example, a connection from the UE 102 to an external IP network, such as to the Internet 110, may be guided via the SAE GW 108. However, also local calls/services are possible in the exemplary radio system.

Each base station 104 of the radio system broadcasts a signal 118 that may be a pilot signal such that the UE 102 can observe a potential base station to serve the UE 102. Based on the pilot signals, the mobile terminal selects a base station with which to start a communication when switched on or on which to perform a handoff during normal operation.

In an ACK/NAK bundling mode, both the UE 102 and the eNB 104 need to know how many resource allocation grants and the corresponding data packets have been transmitted by the eNB 104 and received by the UE 102 in downlink and that need to be simultaneously ACK/NAKed in uplink. Otherwise, UE 102 may send a bundled ACK though some downlink grants have been missed, and this kind of error is denoted as "DTX to ACK" error.

To handle the DTX to ACK error (or limit the probability of DTX to ACK to an acceptable level), in LTE Release 8 TDD (time division duplex) for example, a DAI (downlink assignment index) field has been included in downlink and uplink grants to indicate information related to the number of downlink grants within a "bundling window".

In LTE-Advanced FDD (frequency division duplex) using NxPDCCH structure, one way to support ACK/NAK bundling is to reuse the methods in LTE Release 8 TDD (i.e. from the point of view of ACK/NAK signalling, considering component carriers as TDD sub-frames and including a DAI field in downlink grant to handle DTX to ACK error), which means that a new DAI field should be added into existing DCI formats. Alternatively, design of only LTE-Advanced DCI formats could be considered. However, both of these approaches would mean in essence that a blind DCI decoding burden of LTE-Advanced terminals will be increased. Another issue is that the DAI bits would introduce additional system overhead compared to LTE Release 8 FDD (2 DAI bits in UL/DL grant generate additional control signalling overhead of 2 kb/s, per dynamically scheduled UE, per link (UL/DL) and per CC).

From the point of view of UE power saving and system overhead, the embodiments of the invention show examples of non-DAI based solutions to support ACK/NAK bundling for example in an LTE-Advanced FDD system.

In an embodiment, a solution to support ACK/NAK bundling on the PUCCH in LTE-Advanced when using existing PDCCH design (NxPDCCH) without any DAI bits included in a downlink grant is proposed. It is noted that the support for ACK/NAK multiplexing (with small CM) does not require any special arrangement when using the existing PDCCH design and the mapping tables from Release 8 TDD [TS 36.213 Section 10.1].

In LTE-Advanced FDD using NxPDCCH structure, to support ACK/NAK bundling on PUCCH without DAI, the following methods are straightforward (assuming that M component carriers have been semi-statically allocated within a UE reception bandwidth):
  eNB scheduling PDCCH/PDSCH into all M CCs; or
  eNB scheduling N first (consecutive) CCs (N<M): In such a method, the transmission of a bundled ACK/NAK/DTX is based on the last correctly received PDCCH, and a pre-defined CC numbering scheme is required.

One advantage of these solutions is that no additional overhead requirements related to DAI bits exist. However, severe scheduling constraints are still needed to keep the probability of DTX to ACK at an acceptable level.

Thus, the embodiments of the invention describe more developed non-DAI based solutions to support ACK/NAK bundling e.g. in LTE-Advanced FDD, which may ensure that:
 any number of CC allocation and full scheduling flexibility is supported, and
 the probability of DTX to ACK is limited at an acceptable level (i.e. 1E-4 or lower).

Figure 2:
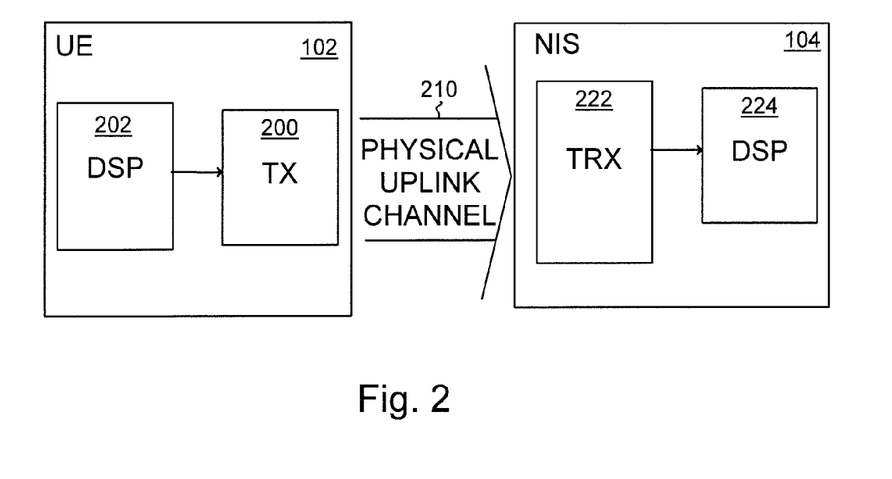
FIG. 2 shows a simplified block diagram illustrating examples of apparatuses that are suitable for use in practising the exemplary embodiments of the invention.

Before further discussing exemplary embodiments of the invention, reference is made to FIG. 2 that shows a simplified block diagram illustrating examples of apparatuses that are suitable for use in practising the exemplary embodiments of the invention.

In FIG. 2, a wireless network is adapted for communication with UE 102 via at least one eNB 104. Although the apparatuses 102, 104 have been depicted as single entities, different modules and memory may be implemented in one or more physical or logical entities. The UE 102 is configured to perform frequency (and/or spatial) domain acknowledgement/negative acknowledgement (ACK/NAK) bundling across component carriers within a user equipment reception bandwidth (the following properties may relate to the UE reception bandwidth: it can be UE-specific or cell-specific. It can also relate to the UE-category. In the case it's UE-specific, it may be dynamically configured e.g., by means of UE-specific higher layer signalling. Reception bandwidth consists of the component carriers in which the UE is capable to receive DL data (e.g. PDSCH)) at the same time. For this purpose, the UE 102 comprises a processor 202, and a communication unit 200 for sending and receiving different outputs, information and messages. The UE 102 may also include a memory for storing control information at least temporarily. The UE 102 further comprises a generator device (e.g. as a part of the processor 202 and/or the memory) configured to generate a bundled ACK/NAK value corresponding to at least one code word on the basis of the performed ACK/NAK bundling. The processor 202 is then configured to include information relating to the generated bundled ACK/NAK value and the number of detected downlink grants within the user equipment reception bandwidth in an ACK/NAK resource to be transmitted on an uplink control channel 210. For example, a memory may store computer program code such as software applications (for example for the detection device) or operating systems, information, data, content, or the like for the processor 202 to perform steps associated with the operation of the apparatus in accordance with embodiments. In the illustrated embodiment, the memory stores instructions on how to perform frequency and/or spatial domain acknowledgement/negative acknowledgement (ACK/NAK) bundling across component carriers of a user equipment reception bandwidth, how to generate a bundled ACK/NAK value corresponding to at least one code word on the basis of the performed ACK/NAK bundling; and how to include information relating to the generated bundled ACK/NAK value and the number of detected downlink grants within the user equipment reception bandwidth in an ACK/NAK resource to be transmitted on an uplink control channel. The memory may be, for example, random access memory (RAM), a hard drive, or other fixed data memory or storage device. Further, the memory, or part of it, may be removable memory detachably connected to the apparatus.

The communication unit 200 is configured to communicate with the apparatus 104 that may be a part of one or more base stations of a public mobile network. The user equipment 102 may also be a user terminal which is a piece of equipment or a device that associates, or is arranged to associate, the user terminal and its user with a subscription and allows the user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminal include a personal computer, a game console, a laptop (a notebook), a personal digital assistant, a mobile station (mobile phone), and a line telephone. The processing unit 202 is typically implemented with a microprocessor, a signal processor or separate components and associated software.

The functionality of the processor 202 is described in more detail below with FIGS. 3 to 12. It should be appreciated that the apparatus may also comprise other different units. However, they are irrelevant to the actual invention and, therefore, they need not be discussed in more detail here.

The apparatus 104 may be any network node or a host which is able to provide the necessary functionality of at least some of the embodiments. The apparatus 104 may be a network entity of a radio system, such as an entity that is a part of a base station. It is also possible that the different modules of the apparatus reside in different network entities of the system.

The apparatus 104 may generally include a processor 224, controller, control unit or the like connected to a memory and to various interfaces 222 of the apparatus. Generally the processor 224 is a central processing unit, but the processor may be an additional operation processor. The processor may comprise a computer processor, application-specific integrated circuit (ASIC), field-programmable gate array (FPGA), and/or other hardware components that have been programmed to carry out one or more functions of an embodiment.

The apparatus 104 may include a memory comprising volatile and/or non-volatile memory, and it typically stores content, data, or the like. For example, the memory may store computer program code such as software applications (for example for the detection device) or operating systems, information, data, content, or the like for the processor 224 to perform steps associated with the operation of the apparatus in accordance with embodiments. In the illustrated embodiment, the memory stores instructions on how to receive information relating to the generated bundled ACK/NAK value and the number of detected downlink grants within a user equipment reception bandwidth included in an acknowledgement/negative acknowledgement (ACK/NAK) resource on an uplink control channel; how to perform ACK/NAK/DTX (discontinuous transmission) detection on the basis of the received information; and how to determine whether a state is correct on the basis of the ACK/NAK/DTX detection. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer, or external to the processor/computer, in which case it can be communicatively coupled to the processor/computer via various means, as is known in the art.

The programming, such as executable code or instructions (e.g. software or firmware), electronic data, databases, or other digital information, can be stored into memories and it may include processor-usable media. Processor-usable media may be embodied in any computer program product or article of manufacture which can contain, store, or maintain programming, data or digital information for use by or in connection with an instruction execution system including the processor 202, 224 in the exemplary embodiment. For example, exemplary processor-usable media may include any one of physical media, such as electronic, magnetic, optical, electromagnetic, and infrared or semiconductor media. Some more specific examples of processor-usable media include, but are not limited to, a portable magnetic computer diskette, such as a floppy diskette, zip disk, hard drive, random-access memory, read only memory, flash memory, cache memory, or other configurations capable of storing programming, data, or other digital information.

At least some embodiments or aspects described herein may be implemented using programming stored within an appropriate memory described above, or communicated via a network or other transmission media and configured to control an appropriate processor. For example, programming may be provided via appropriate media including, for example, embodied within articles of manufacture, embodied within a data signal (e.g. modulated carrier wave, data packets, digital representations etc.) communicated via an appropriate transmission medium, such as a communication network (e.g. the Internet or a private network), wired electrical connection, optical connection or electromagnetic energy, for example, via communications interface, or it may be provided using another appropriate communication structure or medium. Exemplary programming including processor-usable code may be communicated as a data signal embodied in a carrier wave in but one example.

In an embodiment, the processor 202 is further configured to perform spatial domain bundling across two ACK/NAK bits corresponding to at least two spatial code words.

In an embodiment, the generator is further configured to generate the bundled ACK/NAK value by generating one bundled ACK/NAK bit for all downlink transport blocks transmitted in all component carriers and corresponding to at least two spatial code words.

In an embodiment, the processor is configured to perform ACK/NAK bundling on a physical uplink shared channel by using N bits representing $N^2$ states.

In an embodiment, the generator is further configured to select an available state out of a set of orthogonal states on the basis of the generated bundled ACK/NAK value and the number of detected downlink grants, wherein the available orthogonal states comprise one or more following state(s): a state being available due to modulation (e.g. BPSK (binary phase shift keying)/QPSK (quadrature phase shift keying)) constellation, a state being available due to no transmission (i.e. DTX) and a state being available due to occupying multiple resources, and wherein the information to be transmitted on an uplink control channel is conveyed by means of orthogonal state selection. There are a given number of orthogonal states available: two out of fours states per resource due to BPSK/QPSK constellation and one state due to DTX (and DTX+NAK) corresponding to a situation with no transmission. There may also be additional states (Nx) available in the case with multiple resources are used, e.g. due to reservation of multiple (Nx) CCEs (control channel elements). Thus, UE may select one state based on the information relating to the generated bundled ACK/NAK value and the number of detected downlink grants.

In an embodiment, the information to be transmitted on an uplink control channel comprises one or more information bits, the value of the two information bits depending on the value of the bundled ACK/NAK bit and the number of detected downlink grants. In an embodiment, the value of one bit of the two information bits equals the number of received/detected downlink grants within the user equipment reception bandwidth. In an embodiment, the value of one bit of the two information bits equals the bundled ACK/NAK value.

In an embodiment, the processor is further configured to perform a predefined mapping to map the two information bits to at least four states, each state being defined as an ACK or a NAK across two spatial code words and one or more downlink grants.

In an embodiment, the processor is further configured to perform a predefined mapping to map the two information bits to the following four states: State 0 being NAK, across two spatial code words and all downlink grants; State 1 being ACK, across two spatial code words and one or four downlink grants; State 2 being ACK, across two spatial code words and two or five downlink grants; State 3 being ACK, across two spatial code words and 3 downlink grants. In an embodiment, the four states are mapped into QPSK constellation points (or pi/4-rotated QPSK constellation points).

In an embodiment, the processor is further configured to let NAK and DTX share the same state when the bundled ACK/NAK value is NAK. In an embodiment, the processor is further configured to perform a predefined mapping to map the two information bits to the following four states when the bundling result is ACK: State 0 being ACK, across two spatial code words and one or five downlink grants; State 1 being ACK, across two spatial code words and two downlink grants; State 2 being ACK, across two spatial code words and three downlink grants; State 3 being ACK, across two spatial code words and four downlink grants. In an embodiment, the four states are mapped into QPSK constellation points (or pi/4-rotated QPSK constellation points).

In an embodiment, the processor 202 is further configured to perform a predefined mapping to map one or two information bits into a QPSK-modulated symbol and to ensure the largest Euclidian distance in a constellation map between the state(s) corresponding to bundled ACK across an odd number of downlink grants and the state(s) corresponding to bundled ACK across an even number of downlink grants.

In an embodiment, the information to be transmitted on an uplink control channel comprises one or two information bits, and the ACK/NAK resource is one of ACK/NAK channels selected on the basis of a predefined downlink grant. In an embodiment, the value of the one or two information bits equals the bundled ACK/NAK value. In an embodiment, the processor is configured to determine the first or the second ACK/NAK channel on the basis of the number of received/detected downlink grants within the user equipment reception bandwidth.

In an embodiment, when one code word transmission is used, the processor 202 is further configured to perform a predefined mapping to map the value of the one information bit and the ACK/NAK channel selection to the following four states: State 0 being NAK, across all downlink grants or being ACK, across one or five downlink grants; State 1 being ACK, across one or four downlink grants or being ACK, across two downlink grants; State 2 being ACK, across two or five downlink grants or ACK, across three downlink grants; State 3 being ACK, across three downlink grants or ACK, across four downlink grants.

In an embodiment, when one code word transmission is used, the processor is configured to perform a predefined mapping to map the value of the one information bit and the ACK/NAK channel selection to the following states: if the bundling result is NAK, letting NAK and DTX share the same state; if the bundling result is ACK, performing a predefined mapping to map the two information bits to the following four states: State 0 being ACK, across two spatial code words and one or five downlink grants; State 1 being ACK, across two spatial code words and two downlink grants; State 2 being ACK, across two spatial code words and three downlink grants; State 3 being ACK, across two spatial code words and four downlink grants.

In an embodiment, when two code words transmission is used, the processor is configured to: perform a predefined mapping to map the value of the information bits and the ACK/NAK channel selection to eight orthogonal states, each state indicating information relating to the value of bundled ACK/NAK results and the number of detected downlink grants.

In an embodiment, at least one downlink grant within the user equipment reception bandwidth comprises more than one control channel element (CCE) and more than one ACK/NAK channel.

In an embodiment, the processor is configured to determine the value of the two information bits on the basis of the number of detected downlink grants and the bundled ACK/NAK value when the information comprises two information bits.

In an embodiment, the processor is configured to indicate the number of received or detected downlink grants within the user equipment reception bandwidth with the two information bits, and to select one of the ACK/NAK channels on the basis of the bundled ACK/NAK value.

In an embodiment, the processor is configured to transmit the ACK/NAK value by using one bit, and to use channel selection for indicating the number of received or detected downlink grants within the user equipment reception bandwidth.

In an embodiment, the processor is configured to determine a combination of the value of the two information bits and to select one of the ACK/NAK channels based on information related to bundled ACK/NAK results and the number of detected downlink grants.

In an embodiment, an interface 222 is configured to receive information relating to generated bundled ACK/NAK value and the number of detected downlink grants within a user equipment reception bandwidth included in an acknowledgement/negative acknowledgement (ACK/NAK) resource on an uplink control channel, the processor is 224 is configured to perform ACK/NAK/DTX (discontinuous transmission) detection on the basis of the received information; and to determine whether the detected ACK/NAK state represents a correct ACK/NAK on the basis of the ACK/NAK/DTX detection.

In an embodiment, the processor 224 is configured to allocate resources into one or more component carriers on the basis of the result of the ACK/NAK/DTX detection.

In an embodiment, the processor 224 is configured to perform scheduling decisions based on the detected ACK/NAK/DTX.

In an embodiment, there is provided an apparatus comprising: processing means for performing frequency domain acknowledgement/negative acknowledgement (ACK/NAK) bundling across component carriers of a user equipment reception bandwidth; generating means for generating a bundled ACK/NAK value corresponding to at least one code word on the basis of the performed ACK/NAK bundling; and processing means for including information relating to the generated bundled ACK/NAK value and the number of detected downlink grants within the user equipment reception bandwidth in an ACK/NAK resource to be transmitted on an uplink control channel.

In an embodiment there is provided: receiving means for receiving information relating to a generated bundled ACK/NAK value and the number of detected downlink grants within a user equipment reception bandwidth included in an acknowledgement/negative acknowledgement (ACK/NAK) resource on an uplink control channel; processing means for performing ACK/NAK/DTX (discontinuous transmission) detection on the basis of the received information; and processing means for determining whether a state is correct on the basis of the ACK/NAK/DTX detection.

The following examples describe embodiments of non-DAI based methods to support ACK/NAK bundling on PUCCH in LTE-Advanced FDD with NxPDCCH structure. One common nominator for the described methods is that the pre-defined information related to the number of received/detected DL grants within UE reception bandwidth is included in the bundled ACK/NAK message and/or ACK/NAK resource transmitted on the PUCCH.

The rules of an exemplary embodiment 1:
Spatial domain bundling is performed across two ACK/NACK bits corresponding to two spatial code-words. However, this step is not needed in the case of a single code-word transmission,
Frequency domain bundling across CCs within UE reception bandwidth is performed, and one bundled ACK/NAK bit is generated for all DL transport blocks transmitted in all CCs within UE reception bandwidth and corresponding to at least two spatial code-words,
UE transmits two bits of information on an ACK/NAK resource,
At eNB side, eNB performs ACK/NAK/DTX detection at its expected ACK/NAK channel, and checks whether a state is correct or not.

In an embodiment, the value of the two bits depends on the value of a bundled ACK/NAK bit and the number of detected DL grants within the UE reception bandwidth. In an embodiment, the used ACK/NAK resource could be pre-defined (e.g. A/N resource derived from last received/detected DL grant in frequency domain). In an embodiment, a predefined mapping is utilized to map two information bits into a QPSK-modulated symbol, and the mapping should ensure that the neighbour states should have the largest Euclidian distance in the constellation map.

The embodiment 1 provides several advantages, e.g. a non-DAI based solution without additional control overhead is provided, any number of component carrier allocation and full scheduling flexibility can be supported, and the probability of DTX to ACK error can be limited at an acceptable level.

The rules of an exemplary embodiment 2:
Frequency domain ACK/NAK bundling is performed across CCs of UE reception bandwidth, per spatial codeword,
UE transmits one or two information bits (e.g. {b(0)} or {b(0),b(1)}) on one of ACK/NAK channels derived from DL grant #i.

In an embodiment, the value of information bit(s) and the selection of ACK/NAK channel depend on the bundled ACK/NAK value and the number of detected DL grants within the UE reception bandwidth. In an embodiment, the value of i is predefined (e.g. the first or the last detected DL grant containing more than 1 CCE).

At least one DL grant within the UE reception bandwidth contains more than one CCE (Note: this DL grant could be in any CC within the UE reception bandwidth).
At eNB side, eNB performs ACK/NAK/DTX detection at its expected ACK/NAK channel, and checks whether a state is correct or not.

The embodiment 2 provides several advantages, e.g. a non-DAI based solution without additional control overhead is provided, there is no need to perform spatial bundling, any number of component carrier allocation can be supported, and the probability of DTX to ACK error can be limited at an acceptable level.

The rules of an exemplary embodiment 3 that is a combination of embodiments 1 and 2 above:
Spatial domain bundling is performed across two ACK/NACK bits corresponding to two spatial code-words in the case of MIMO,
Frequency domain bundling is performed across UE reception bandwidth, and one bundled ACK/NAK bit is generated within the UE reception bandwidth per bundled spatial code-words,
UE transmits two bits of information (e.g. {b(0),b(1)}) on an ACK/NAK resource, which is one of ACK/NAK channels derived from a predefined DL grant.

In an embodiment, the value of two bits and the channel selection depend on the number of received/detected DL grants and the value of bundled ACK/NAK. The combination may be:
Two bits are used to indicate the number of received/detected DL grants within UE reception bandwidth, and the channel selection depends on the value of bundled ACK/NAK, or
One bit is used to send the value of bundled ACK/NAK, and the combination of another bit and channel selection is used to indicate the number of received/detected DL grants within UE reception bandwidth, or
The combination of the value of two information bits and channel selection depends on the information related to the bundled ACK/NAK results and the number of detected DL grants.
At least one DL grant within the UE reception bandwidth contains more than one CCE (Note: this DL grant could be in any CC within UE reception bandwidth).

The embodiment 3 provides several advantages, e.g. a non-DAI based solution without additional control overhead is provided, any number of component carrier allocation can be supported, and more states are available to handle DTX to ACK error, which means an improved error case handling ability.

Figure 3:
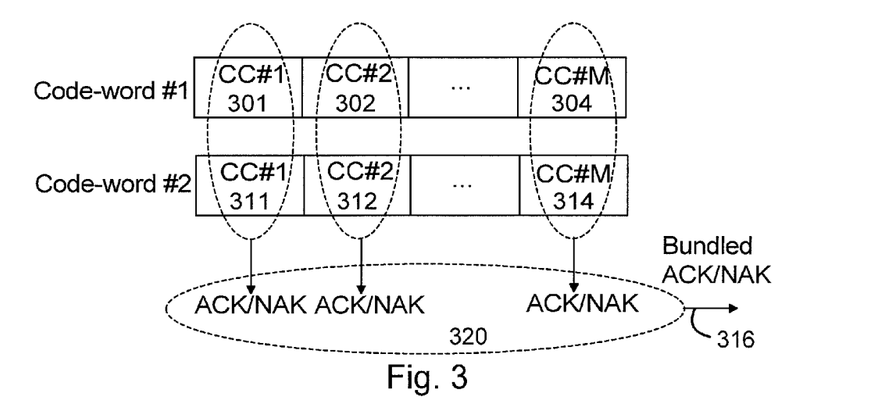
FIG. 3 shows an exemplary illustration of a method according to an embodiment of the invention.

FIG. 3 shows an exemplary illustration of a method according to an embodiment of the invention, e.g. embodiment 1 above. Code-word #1 and code-word #2 comprise M component carriers 301, 302, ..., 304, and 311, 312, ..., 314. First, spatial domain bundling is performed across two ACK/NAK bits corresponding to the two spatial code words (Code-word #1 and Code-word #2). This is illustrated by the dashed lines that circle component carrier bits 301 and 311, 302 and 312, 304 and 314. Next, frequency domain bundling across the component carriers of a UE reception bandwidth is performed (illustrated by the dashed circle 320), and one bundled ACK/NAK bit 316 is generated for all downlink transport blocks transmitted in all component carriers within UE reception bandwidth and corresponding to the two spatial code words.

Then, UE transmits two information bits (e.g. {b(0),b(1)}) on an ACK/NAK resource: (1) The value of one bit equals the number of received/detected downlink grants within UE reception bandwidths MOD 2 (i.e. Number_of_RX_DL_Grant Mod 2), (2) The value of another bit equals the value of the bundled ACK/NAK, (3) The ACK/NAK resource used is predefined (e.g. ACK/NAK resource derived from the last received downlink grant in a frequency domain).

Next, the examples of different options that may be used for implementing the method according to the embodiment 1 of FIG. 3 are described:

Option 1-1:
The value of one bit is named as "checking bit" (e.g. b(0) in the following examples), and it equals the number of received/detected downlink grants within UE reception bandwidth MOD 2 (i.e. Number_of_RX_DL_Grant MOD 2), and
The value of another bit (e.g. b(1) in the following examples) equals the value of the bundled ACK/NAK value.

Option 1-2:
A predefined mapping is utilized to map the two bits to the following four states:
State 0: NAK, across 2 spatial code-words and all DL grants,
State 1: ACK, across 2 spatial code-words and 1 or 4 DL grants,
State 2: ACK, across 2 spatial code-words and 2 or 5 DL grants,
State 3: ACK, across 2 spatial code-words and 3 DL grants.

Option 1-3:
If the bundling result is NAK, let NAK and DTX share the same state,
If the bundling result is ACK, utilize a predefined mapping to map the two bits to the following four states:
State 0: ACK, across 2 spatial code-words and 1/or 5 DL grants,
State 1: ACK, across 2 spatial code-words and 2 DL grants,
State 2: ACK, across 2 spatial code-words and 3 DL grants,
State 3: ACK, across 2 spatial code-words and 4 DL grants.

In an embodiment, the used ACK/NAK resource may be predefined (e.g. A/N resource derived from last received/detected DL grant in a frequency domain in the following examples).

In an embodiment, a pre-defined mapping is utilized to map two information bits into a QPSK-modulated symbol, and the mapping should ensure that the neighbour states should have the largest Euclidian distance in the constellation map.

At eNB side, eNB performs ACK/NAK/DTX detection at its expected ACK/NAK channel, and checks whether the state is correct or not.

FIGS. 4 to 7 show error case handling examples for the embodiment 1 described above. It is assumed that four chunks are within the UE reception bandwidth and three downlink grants have been allocated (dual code word is used).

Figure 4:
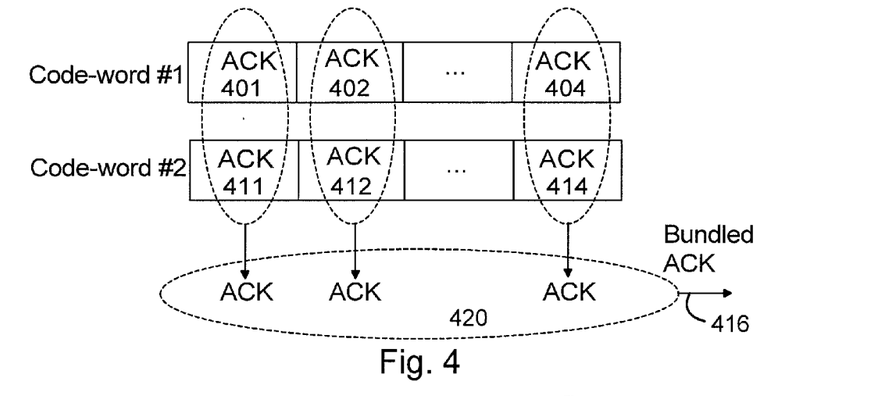
FIG. 4 shows an exemplary illustration of an implementation of the method relating to FIG. 3.

FIG. 4 shows an exemplary illustration of an implementation of the method relating to FIG. 3. In the example of FIG. 4, it is assumed that all downlink grants have been received/detected correctly. Code-word #1 and Code-word #2 illustrated in FIG. 4 comprise M component carriers 401, 402, . . . , 404, and 411, 412, . . . , 414. First, spatial domain bundling is performed across two ACK/NAK bits corresponding to the two spatial code words (Code-word #1 and Code-word #2). This is illustrated by the dashed lines that circle the component carrier bits 401 and 411, 402 and 412, 404 and 414. Next, frequency domain bundling across the component carriers of the UE reception bandwidth is performed (illustrated by the dashed circle 420), and one bundled ACK/NAK bit 416 is generated for all downlink transport blocks transmitted in all component carriers within the UE reception bandwidth and corresponding to the two spatial code words.

Then, the UE transmits two information bits on an ACK/NAK resource: (1) The value of one bit equals Number_of_RX_DL_Grant MOD 2, here Number_of_RX_DL_Grant=3, thus b(0)=3 MOD 2=1, (2) The value of another bit equals the value of the bundled ACK/NAK, here: Bundled_AN_Value=1, thus b(1)=1. The UE transmits {1,1} on an ACK/NAK resource corresponding to downlink grant in CC #4. eNB per-forms the following checking process: (1) b(0) should equal to 1, (2) The ACK/NAK channel used should be derived from downlink grant in CC #4, no DTX to ACK error.

Figure 5:
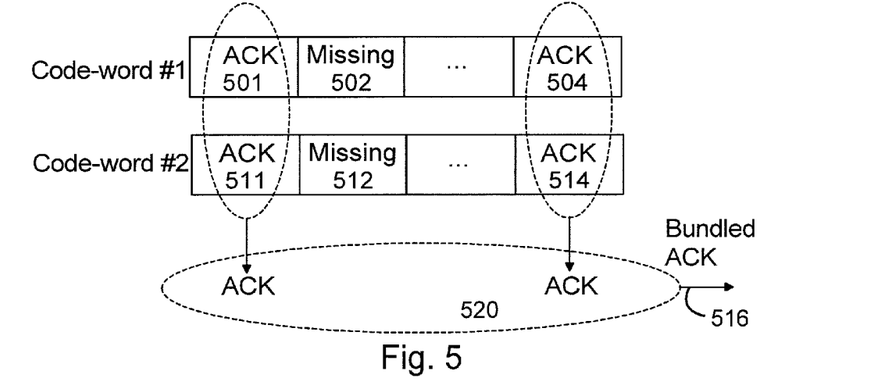
FIG. 5 shows an exemplary illustration of another implementation of the method relating to FIG. 3.

FIG. 5 shows an exemplary illustration of another implementation of the method relating to FIG. 3. In the example of FIG. 5, the downlink grant in CC#2 is missed (no DTX to ACK error). Code-word #1 and Code-word #2 illustrated in FIG. 5 comprise M component carriers 501, 502, . . . , 504, and 511, 512, . . . , 514. First, spatial domain bundling is performed across two ACK/NAK bits corresponding to the two spatial code words (Code-word #1 and Code-word #2). This is illustrated by the two dashed lines that circle the component carrier bits 501 and 511, 504 and 514. Next, frequency domain bundling across the component carriers of a UE reception bandwidth is performed (illustrated by the dashed circle 520), and one bundled ACK/NAK bit 516 is generated for all downlink transport blocks transmitted in all component carriers within the UE reception bandwidth and corresponding to the two spatial code words.

Then, UE transmits two information bits on an ACK/NAK resource: (1) The value of one bit equals Number_of_RX_DL_Grant, here Number of RX_DL_Grant=2, thus b(0)=2 MOD 2=0, (2) The value of another bit equals the value of the bundled ACK/NAK, here: Bundled_AN_Value=1, thus b(1)=1. The UE transmits {0,1} on an ACK/NAK resource corresponding to downlink grant in CC #4. eNB could detect the error due to a wrong b(0) value. Thus, no DTX to ACK error takes place.

Figure 6:
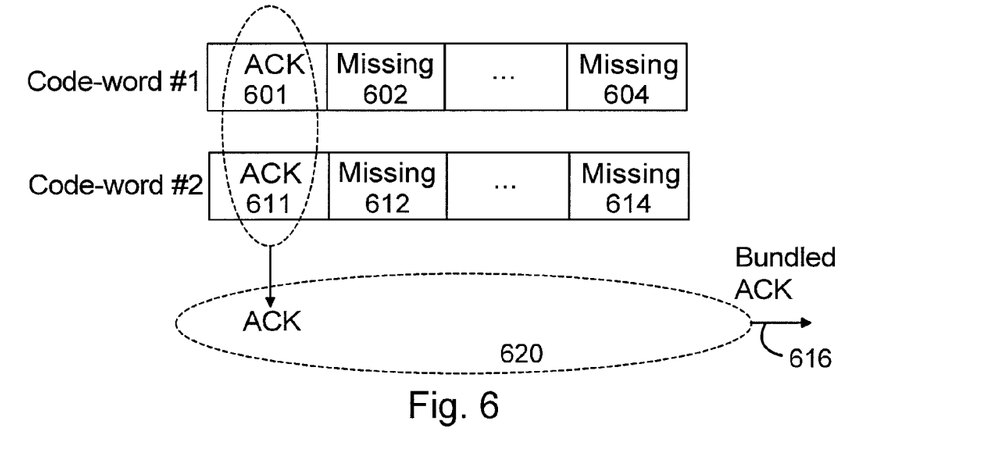
FIG. 6 shows an exemplary illustration of another implementation of the method relating to FIG. 3.

FIG. 6 shows an exemplary illustration of another implementation of the method relating to FIG. 3. In the example of FIG. 6, the downlink grants in CC#2 and CC#4 are missed (no DTX to ACK error). Code-word #1 and Code-word #2 illustrated in FIG. 6 comprise M component carriers 601, 602, . . . , 604, and 611, 612, . . . , 614. First, spatial domain bundling is performed across two ACK/NAK bits corresponding to the two spatial code words (Code-word #1 and Code-word #2). This is illustrated by the dashed line that circles the component carrier bits 601 and 611. Next, frequency domain bundling across the component carriers of a UE reception bandwidth is performed (illustrated by the dashed circle 620), and one bundled ACK/NAK bit 616 is generated for all downlink transport blocks transmitted in all component carriers within the UE reception bandwidth and corresponding the two spatial code words.

Then, UE transmits two information bits on an ACK/NAK resource: (1) The value of one bit equals Number_of_RX_DL_Grant=1, thus b(0)=1 MOD 2=1, (2) The value of another bit equals the value of the bundled ACK/NAK, here: Bundled_AN_Value=1, thus b(1)=1. The UE transmits {1,1} on an ACK/NAK resource corresponding to downlink grant in CC #1. eNB could detect the error due to the wrong ACK/NAK resource. Thus, no DTX to ACK error takes place.

Figure 7:
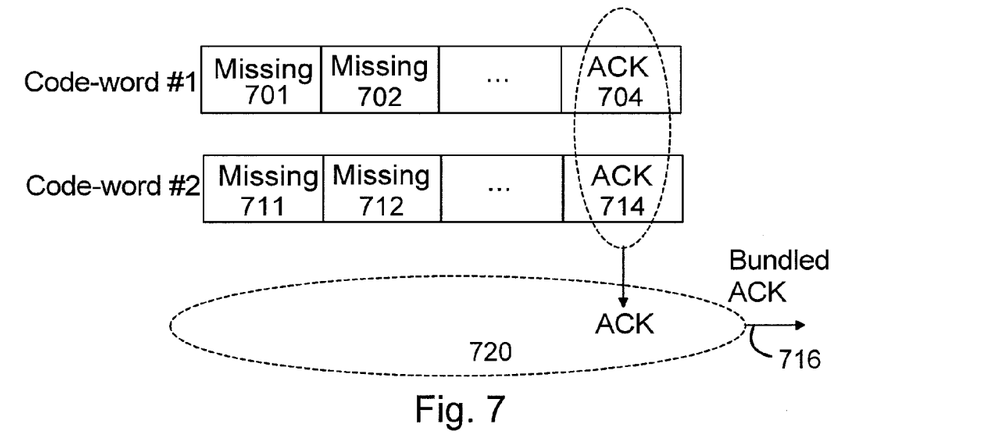
FIG. 7 shows an exemplary illustration of another implementation of the method relating to FIG. 3.

FIG. 7 shows an exemplary illustration of another implementation of the method relating to FIG. 3. In the example of FIG. 7, the downlink grants in CC#1 and CC#2 are missed and a DTX to ACK error exists. However, the error probability is below 1E-4, assuming that the probability of a single downlink grant failure is below 1E-2. Further, if options 1-2 or 1-3 of the method were used, an error case would not take place. Code-word #1 and Code-word #2 illustrated in FIG. 7 comprise M component carriers 701, 702, . . . , 704, and 711, 712, . . . , 714. First, spatial domain bundling is performed across two ACK/NAK bits corresponding to the two spatial code words (Code-word #1 and Code-word #2). This is illustrated by the dashed line that circles the component carrier bits 704 and 714. Next, frequency domain bundling across the component carriers of a UE reception bandwidth is performed (illustrated by the dashed circle 720), and one bundled ACK/NAK bit 716 is generated for all downlink transport blocks transmitted in all component carriers within the UE reception bandwidth and corresponding to the two spatial code words.

Then, UE transmits two information bits on an ACK/NAK resource: (1) The value of one bit equals Number_of_RX_DL_Grant=1, thus b(0)=1 MOD 2=1, (2) The value of another bit equals the value of the bundled ACK/NAK, here: Bundled_AN_Value=1, thus b(1)=1. The UE transmits {1,1} on an ACK/NAK resource corresponding to downlink grant in CC #4. eNB could not detect DTX to ACK error. However, the error probability is around 1E-4. In an embodiment, the missing cases across different chunks may be considered as independent.

Figure 8:
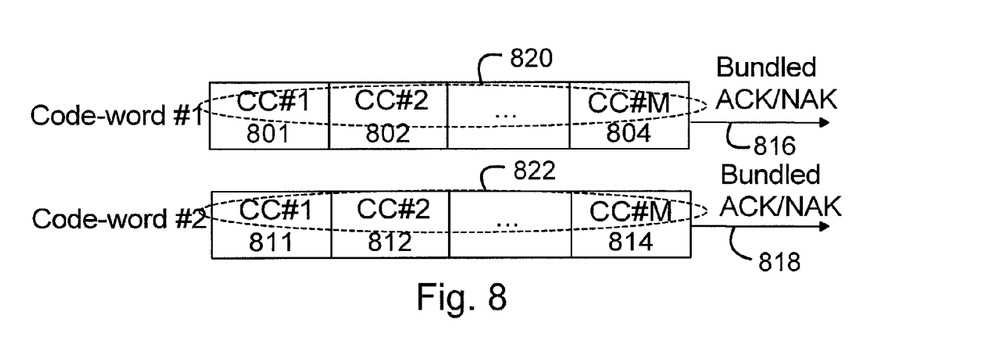
FIG. 8 shows an exemplary illustration of a method according to an embodiment of the invention.

FIG. 8 shows an exemplary illustration of another method according to an embodiment of the invention, i.e. embodiment 2 above. Code-word #1 and Code-word #2 comprise M component carriers 801, 802, . . . , 804, and 811, 812, . . . , 814. First, frequency domain ACK/NAK bundling across CCs within a UE reception bandwidth, per spatial code-word is performed (illustrated by the dashed circles 820 and 822), and bundled ACK/NAK bits 816 and 818 are generated for all downlink transport blocks transmitted in all component carriers within the UE reception bandwidth and corresponding to the two spatial code words.

Then, UE transmits one or two information bits (e.g. {b(0)} or {b(0),b(1)}) on the first or the second ACK/NAK channel derived from downlink grant #i. The value of information bit(s) and the selection of ACK/NAK channel may be determined according to the following options:

Option 2-1:
The value of information bit(s) equals the bundled ACK/NAK result(s).
UE uses the first or the second ACK/NAK channel, depending on the number of received/detected downlink grants within the UE reception bandwidth. In the following examples:

UE uses the first channel if Number_of_RX_DL_Grant MOD 2 equals 0,

UE uses the second channel if Number_of_RX_DL_Grant MOD 2 equals 1.

Option 2-2:

In the case of one code-word: a predefined mapping may be utilized to map the value of information bit and ACK/NAK channel selection to the following four states (Option 2-2-1):

State 0: NAK, across all DL grants or ACK, across 1 or 5 DL grants,

State 1: ACK, across 1 or 4 DL grants or ACK, across 2 DL grants,

State 2: ACK, across 2 or 5 DL grants or ACK, across 3 DL grants,

State 3: ACK, across 3 DL grants or ACK, across 4 DL grants.

In the case of one code-word, another possibility is to utilize a predefined mapping to map the value of information bit and ACK/NAK channel selection to the following states (Option 2-2-2):

If the bundling result is NAK, let NAK and DTX share the same state,

If the bundling result is ACK, utilize a predefined mapping to map two bits to the following four states:

State 0: ACK, across 2 spatial code-words and 1 or 5 DL grants,

State 1: ACK, across 2 spatial code-words and 2 DL grants,

State 2: ACK, across 2 spatial code-words and 3 DL grants,

State 3: ACK, across 2 spatial code-words and 4 DL grants.

In the case of two code-words, utilize a predefined mapping to map the value of information bits and ACK/NAK channel selection to eight orthogonal states.

Each state is used to indicate information related to the value of bundled ACK/NAK results and the number of detected downlink grants.

The value of i is predefined (e.g. the last detected DL grant containing more than 1 CCE in following examples).

Further, it is assumed that at least one downlink grant within a UE reception bandwidth contains more than one CCE (Note: this DL grant could be in any CC within the UE reception bandwidth).

At eNB side, eNB performs ACK/NAK/DTX detection at its expected ACK/NAK channel, and checks whether the state is correct or not.

FIGS. 9 to 12 show error case handling examples for the embodiment 2 described above. It is assumed that four chunks are within a UE reception bandwidth and three downlink grants have been allocated (dual code-word is used).

Figure 9:
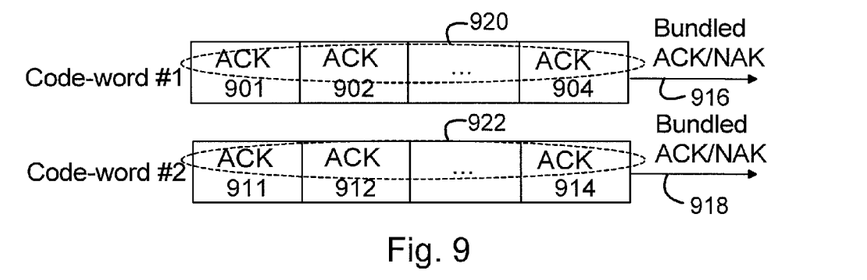
FIG. 9 shows an exemplary illustration of an implementation of a method relating to FIG. 8.

FIG. 9 shows an exemplary illustration of an implementation of the method relating to FIG. 8. In the example of FIG. 9, it is assumed that all downlink grants have been received/detected. Code-word #1 and Code-word #2 illustrated in FIG. 9 comprise M component carriers 901, 902, ..., 904, and 911, 912, ..., 914. First, frequency domain bundling across the component carriers of the UE reception bandwidth is performed (illustrated by the dashed circles 920 and 922), and bundled ACK/NAK bits 916 and 918 are generated for all downlink transport blocks transmitted in all component carriers within the UE reception bandwidth and corresponding to the two spatial code words.

Then, UE transmits information bit(s) on an ACK/NAK resource: (1) The value of the information bits equals the bundled ACK/NAK result(s), here Number_of_RX_DL_Grant=3, thus UE transmits bundled ACK/NAKs on the second channel derived from downlink grant in CC#4. eNB performs checking: the ACK/NAK channel used should be the second channel derived from the downlink grant in CC#4. Thus, no DTX to ACK error takes place.

Figure 10:
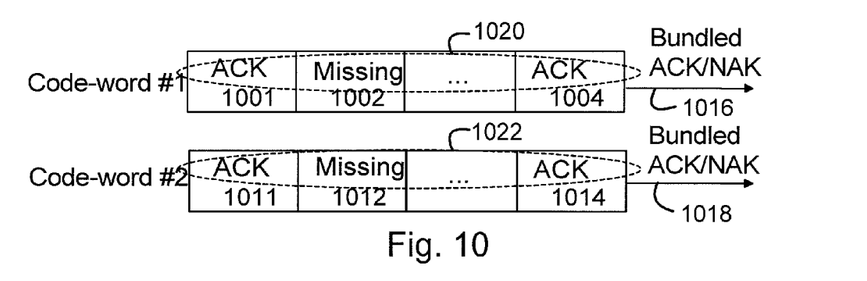
FIG. 10 shows an exemplary illustration of another implementation of the method relating to FIG. 8.

FIG. 10 shows an exemplary illustration of another implementation of the method relating to FIG. 8. In the example of FIG. 10, it is assumed that the downlink grant in CC#2 is missed (no DTX to ACK error). Code-word #1 and Code-word #2 illustrated in FIG. 10 comprise M component carriers 1001, 1002, ..., 1004, and 1011, 1012, ..., 1014. First, frequency domain bundling across the component carriers of a UE reception bandwidth is performed (illustrated by the dashed circles 1020 and 1022), and bundled ACK/NAK bits 1016 and 1018 are generated for all downlink transport blocks transmitted in all component carriers within the UE reception bandwidth and corresponding to the two spatial code words.

Then, UE transmits information bit(s) on an ACK/NAK resource: (1) The value of the information bits equals the bundled ACK/NAK result(s), here Number_of_RX_DL_Grant=2, thus the UE transmits bundled ACK/NAKs on the first channel derived from downlink grant in CC#4. The UE uses a wrong ACK/NAK channel. Thus, no DTX to ACK error takes place.

Figure 11:
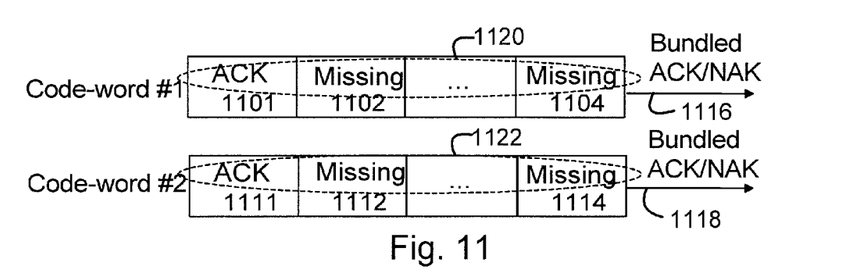
FIG. 11 shows an exemplary illustration of another implementation of the method relating to FIG. 8.

FIG. 11 shows an exemplary illustration of another implementation of the method relating to FIG. 8. In the example of FIG. 11, it is assumed that the downlink grants in CC#2 and CC#4 are missed (no DTX to ACK error). Code-word #1 and Code-word #2 illustrated in FIG. 11 comprise M component carriers 1101, 1102, ..., 1104, and 1111, 1112, ..., 1114. First, frequency domain bundling across the component carriers of a UE reception bandwidth is performed (illustrated by the dashed circles 1120 and 1122), and bundled ACK/NAK bits 1116 and 1118 are generated for all downlink transport blocks transmitted in all component carriers within the UE reception bandwidth and corresponding to two spatial code words.

Then, UE transmits information bit(s) on an ACK/NAK resource: (1) The value of the information bits equals the bundled ACK/NAK result(s), here Number_of_RX_DL_Grant=1, thus the UE transmits bundled ACK/NAKs on the second channel derived from downlink grant in CC#1. The UE uses a wrong ACK/NAK channel. Thus, no DTX to ACK error takes place.

Figure 12:
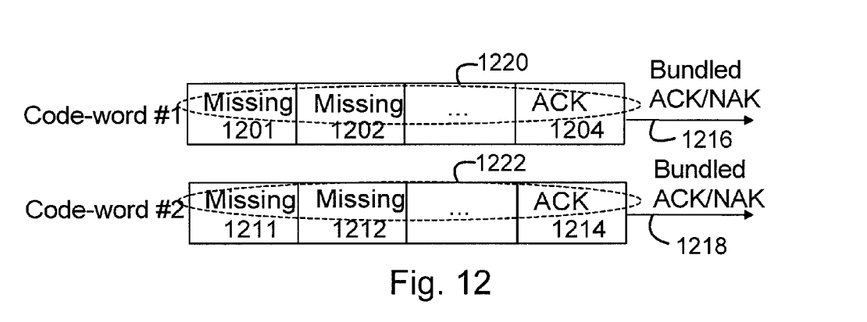
FIG. 12 shows an exemplary illustration of another implementation of the method relating to FIG. 8.

FIG. 12 shows an exemplary illustration of another implementation of the method relating to FIG. 8. In the example of FIG. 12, it is assumed that the downlink grants in CC#1 and CC#2 are missed and a DTX to ACK error exists. However, the error probability is below 1E-4 assuming that the probability of a single downlink grant failure is below 1E-2. Further, if option 2-2 of the method were used, an error case would not take place. Code-word #1 and Code-word #2 illustrated in FIG. 12 comprise M component carriers 1201, 1202, ..., 1204, and 1211, 1212, ..., 1214. First, frequency domain bundling across the component carriers of a UE reception bandwidth is performed (illustrated by the dashed circles 1220 and 1222), and bundled ACK/NAK bits 1216 and 1218 are generated for all downlink transport blocks transmitted in all component carriers within the UE reception bandwidth and corresponding to the two spatial code words.

Then, UE transmits information bit(s) on an ACK/NAK resource: (1) The value of the information bits equals the bundled ACK/NAK result(s), here Number_of_RX_DL_Grant=1, thus the UE transmits bundled ACK/NAKs on the second channel derived from downlink grant in CC#4. The UE could not detect the error. Thus, a DTX to ACK error exists with a probability around 1E-An 4.

An implementation of the embodiment 3 above (i.e. the combination of the embodiments 1 and 2) may comprise:

Performing spatial domain bundling across two spatial codewords,

Then performing frequency domain bundling across a UE reception bandwidth, and generating one bundled ACK/NAK bit within the UE reception bandwidth per two spatial code-words, UE transmitting two bits of information (e.g. {b(0),b(1)}) on one of ACK/NAK channels derived from a predefined DL grant:

Option 3-1:
2 bits (e.g. {b(0), b(1)}) are used to indicate Number_of RX_DL_Grant MOD 4,
The predefined DL grant could be the first or the last detected DL grant containing more than 1 CCE,
UE transmits {b(0),b(1)} on the first or the second ACK/NAK channel depends on the value of bundled ACK/NAK.

Option 3-2:
1 bit (e.g. b(0)) equals the value of bundled ACK/NAK,
The predefined DL grant could be the first or the last detected DL grant containing more than 1 CCE,
The combination of the value of another bit (e.g. b(1)) and the ACK/NAK channel selection between the first and the second ACK/NAK channel are used to indicate Number_of RX_DL_Grant MOD 4.

Option 3-3:
The predefined DL grant could be the first or the last detected DL grant containing more than 1 CCE,
The combination of the value of 2 bits and the channel selection depend on the value of bundled ACK/NAK result(s) and the number of detected DL grants.

General advantage of the different embodiments of the invention is that several ways are provided to support ACK/NAK bundling e.g. in an LTE-Advanced system based on usage of the existing PDCCH design (NxPDCCH). ACK/NAK bundling is needed to optimize uplink coverage in the LTE-Advanced system. Bundling can be supported without using DAI bits in UL/DL grant. This means that existing DCI formats can be used in LTE-Advanced with channel aggregation (no need for additional DCI formats). Further, a complete uplink control solution can be realized without downlink control overhead caused by DAI bits (since ACK/NAK multiplexing can be supported without the need for DAI bits).

Figure 13:
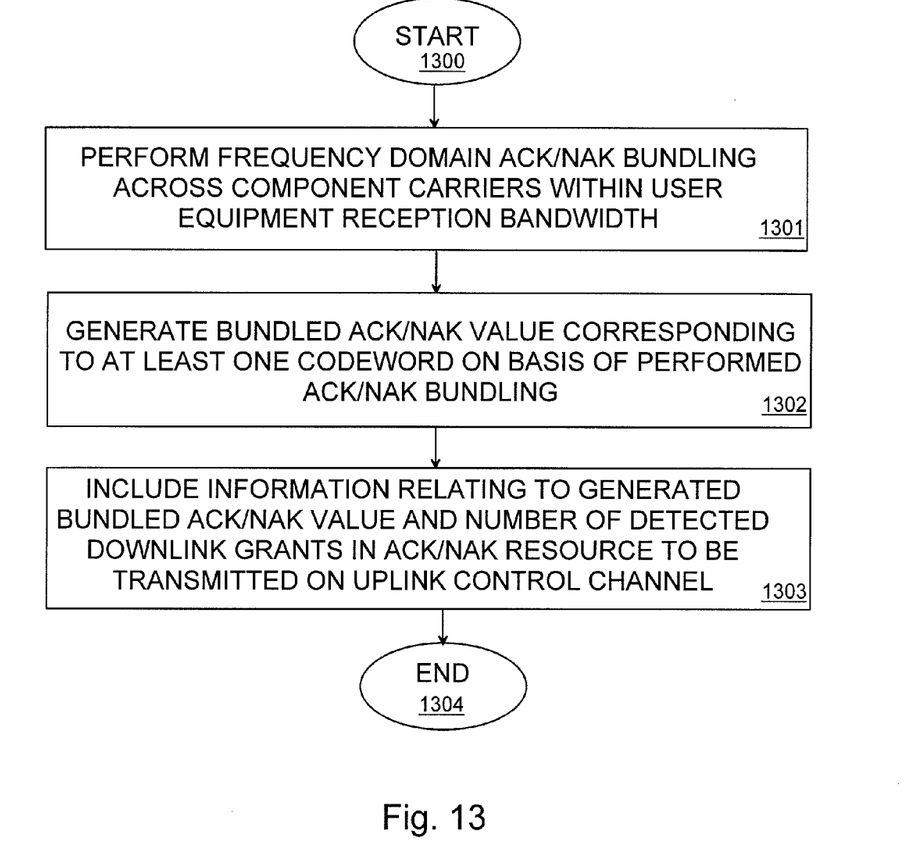
FIG. 13 illustrates an example of a method according to an embodiment of the invention.

FIG. 13 illustrates an example of a method according to an embodiment. The method starts in 1300. In 1301, an apparatus, e.g. in a UE, performs frequency domain ACK/NAK bundling across component carriers of a user equipment reception bandwidth. In 1302, a bundled ACK/NAK value corresponding to at least one code word is generated on the basis of the performed ACK/NAK bundling. In 1303, information relating to the generated bundled ACK/NAK value and the number of detected downlink grants within the user equipment reception bandwidth is included in an ACK/NAK resource to be transmitted on an uplink control channel. The method ends in 1304.

It will be obvious to a person skilled in the art that as technology advances, the inventive concept can be implemented in various ways. The invention and its embodiments are not limited to the examples described above but may vary within the scope of the claims.

The invention claimed is:

1. An apparatus comprising:
a processor configured to perform frequency domain acknowledgement/negative acknowledgement (ACK/NAK) bundling across component carriers within a user equipment reception bandwidth;
a generator configured to generate a bundled ACK/NAK value corresponding to at least one code word on the basis of the performed ACK/NAK bundling; and
a processor configured to include information relating to the generated bundled ACK/NAK value and the number of detected downlink grants within the user equipment reception bandwidth in an ACK/NAK resource to be transmitted on an uplink control channel.

2. The apparatus of claim 1, further comprising a processor configured to perform spatial domain bundling across two ACK/NAK bits corresponding to at least two spatial code words.

3. The apparatus of claim 1, wherein DAI bits are not available for use in uplink/downlink grants.

4. The apparatus of claim 1, wherein the processor is configured to perform ACK/NAK bundling on a physical uplink shared channel by using N bits representing $N^2$ states.

5. The apparatus of claim 1, wherein the processor is configured to select an available state out of a set of orthogonal states on the basis of the generated bundled ACK/NAK value and the number of detected downlink grants, wherein the available orthogonal states comprise one or more of the following state(s): a state being available due to modulation constellation, a state being available due to no transmission, a state being available due to occupying multiple resources, and wherein the information to be transmitted on an uplink control channel is conveyed by means of orthogonal state selection.

6. The apparatus of claim 5, further comprising a processor configured to perform a predefined mapping to map one or two information bits into a QPSK-modulated symbol and to ensure having the largest Euclidian distance in a constellation map between the state(s) corresponding to bundled ACK across an odd number of downlink grants and the state(s) corresponding to bundled ACK across an even number of downlink grants.

7. The apparatus of claim 1, wherein the information to be transmitted on an uplink control channel comprises one or more information bits, and the ACK/NAK resource is one of ACK/NAK channels selected based on a predefined downlink grant.

8. The apparatus of claim 1, wherein at least one downlink grant within the user equipment reception bandwidth comprises more than one control channel element and more than one ACK/NAK channel.

9. User equipment configured to perform functionality according to claim 1.

10. A method comprising:
performing frequency domain acknowledgement/negative acknowledgement (ACK/NAK) bundling across component carriers within a user equipment reception bandwidth;
generating a bundled ACK/NAK value corresponding to at least one code word on the basis of the performed ACK/NAK bundling; and
including information relating to the generated bundled ACK/NAK value and the number of detected downlink grants within the user equipment reception bandwidth in an ACK/NAK resource to be transmitted on an uplink control channel.

11. The method of claim 10, the method further comprising: performing spatial domain bundling across two ACK/NAK bits corresponding to at least two spatial code words.

12. The method of claim 10, the method further comprising: selecting an available state out of a set of orthogonal states on the basis of the generated bundled ACK/NAK value and the number of detected downlink grants, wherein the available orthogonal states comprise one or more of the following state(s): a state being available due to modulation constellation, a state being available due to no transmission, a state being available due to occupying multiple resources, and wherein the information to be transmitted on an uplink control channel is conveyed by means of orthogonal state selection.

13. The method of claim 12, the method further comprising: performing a predefined mapping to map the two information bits to at least four states, each state being defined as an ACK or a NAK across two spatial code words and one or more downlink grants.

14. The method of claim 12, the method further comprising: letting NAK and DTX share the same state when the bundled ACK/NACK value is NAK.

15. The method of claim 12, the method further comprising: performing a predefined mapping to map the one or two information bits into a QPSK-modulated symbol and to ensure having the largest Euclidian distance in a constellation map between the state(s) corresponding to bundled ACK across an odd number of downlink grants and the state(s) corresponding to bundled ACK across an even number of downlink grants.

16. An article of manufacture, comprising a computer readable medium and embodying program instructions thereon executable by a computer operably coupled to a memory which, when executed by the computer, carry out the functions of:
performing frequency domain acknowledgement/negative acknowledgement (ACK/NAK) bundling across component carriers within a user equipment reception bandwidth;
generating a bundled ACK/NAK value corresponding to at least one code word on the basis of the performed ACK/NAK bundling; and
including information relating to the generated bundled ACK/NAK value and the number of detected downlink grants within the user equipment reception bandwidth in an ACK/NAK resource to be transmitted on an uplink control channel.

17. The article of manufacture of claim 16, the computer readable medium including at least one of the following media: a computer readable medium, a program storage medium, a record medium, a computer readable memory, a computer readable software distribution package, a computer readable signal, a computer readable telecommunication signal, and a computer readable compressed software package.

18. The article of manufacture of claim 16, which further carry out the function of selecting an available state out of a set of orthogonal states on the basis of the generated bundled ACK/NAK value and the number of detected downlink grants, wherein the available orthogonal states comprise one or more of the following state(s): a state being available due to modulation constellation, a state being available due to no transmission, a state being available due to occupying multiple resources, and wherein the information to be transmitted on an uplink control channel is conveyed by means of orthogonal state selection.

19. An apparatus comprising:
processing means for performing frequency domain acknowledgement/negative acknowledgement (ACK/NAK) bundling across component carriers within a user equipment reception bandwidth;
generating means for generating a bundled ACK/NAK value corresponding to at least one code word on the basis of the performed ACK/NAK bundling; and
processing means for including information relating to the generated bundled ACK/NAK value and the number of detected downlink grants within the user equipment reception bandwidth in an ACK/NAK resource to be transmitted on an uplink control channel.

* * * * *